United States Patent
Makino

(10) Patent No.: US 9,797,532 B2
(45) Date of Patent: Oct. 24, 2017

(54) PIPE JOINT, AIR CONDITIONER, METHOD FOR PRODUCING CONNECTING PIPE, CONNECTING PIPE, AND CONNECTION METHOD

(71) Applicant: Hiroaki Makino, Tokyo (JP)

(72) Inventor: Hiroaki Makino, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 455 days.

(21) Appl. No.: 14/373,424

(22) PCT Filed: Mar. 7, 2013

(86) PCT No.: PCT/JP2013/056340
§ 371 (c)(1),
(2) Date: Jul. 21, 2014

(87) PCT Pub. No.: WO2013/150858
PCT Pub. Date: Oct. 10, 2013

(65) Prior Publication Data
US 2015/0008669 A1    Jan. 8, 2015

(30) Foreign Application Priority Data

Apr. 2, 2012   (JP) ................. 2012-084258

(51) Int. Cl.
*F16L 15/04*    (2006.01)
*F16L 19/02*    (2006.01)
(Continued)

(52) U.S. Cl.
CPC ........ *F16L 19/0212* (2013.01); *B21D 17/025* (2013.01); *B21D 19/08* (2013.01);
(Continued)

(58) Field of Classification Search
CPC . F16L 19/0212; F16L 19/0225; F16L 19/028; F16L 19/0283
(Continued)

(56) References Cited

U.S. PATENT DOCUMENTS

| 920,963 | A | * | 5/1909 | Keyes | ............ F16L 19/04 |
| | | | | | 285/383 |
| 1,817,854 | A | * | 8/1931 | Sorensen | ........... B21D 17/025 |
| | | | | | 285/382.5 |

(Continued)

FOREIGN PATENT DOCUMENTS

DE   20 2004 012 959 U1   11/2004
EP       0995937 A2    4/2000
(Continued)

OTHER PUBLICATIONS

Office Action mailed Mar. 31, 2015 issued in corresponding JP patent application No. 2014-509091 (and English translation).
(Continued)

*Primary Examiner* — David E Bochna
(74) *Attorney, Agent, or Firm* — Posz Law Group, PLC

(57) ABSTRACT

A pipe joint is connected with a connecting pipe, and includes a pipe joint body and a nut member. When the connecting pipe formed with a bead expanded in the radial direction is connected with this pipe joint, a male thread of the pipe joint body is engaged with a female thread of the nut member to hold the bead between a tapered face and a tapered face. In addition, the joined portion between the bead and the tapered face forms a first sealed portion, and a joined portion between the bead and the tapered face forms a second sealed portion. Still further, a tapered face of the pipe joint body is joined with the tapered face of the nut member to form a third sealed portion.

9 Claims, 15 Drawing Sheets

(51) Int. Cl.
*F16L 19/028* (2006.01)
*B21D 17/02* (2006.01)
*B21D 39/04* (2006.01)
*B21D 19/08* (2006.01)

(52) U.S. Cl.
CPC .............. *B21D 39/04* (2013.01); *F16L 15/04* (2013.01); *F16L 19/028* (2013.01); *F16L 19/0225* (2013.01); *F16L 19/0283* (2013.01); *F25B 2500/221* (2013.01)

(58) Field of Classification Search
USPC ...................................................... 285/382.5
See application file for complete search history.

(56) References Cited

U.S. PATENT DOCUMENTS

| | | | | |
|---|---|---|---|---|
| 1,858,136 | A * | 5/1932 | Brenner | F16L 19/028 285/382.5 |
| 1,961,453 | A * | 6/1934 | Quarnstrom | F16L 19/028 285/382.5 |
| 2,438,529 | A * | 3/1948 | Woodling | F16L 27/0816 285/382.5 |
| 2,463,883 | A * | 3/1949 | Kinsey | F16L 19/028 285/382.5 |
| 2,469,851 | A * | 5/1949 | Stecher | F16L 19/00 285/382.5 |
| 2,477,677 | A * | 8/1949 | Woodling | F16L 19/028 285/281 |
| 2,545,168 | A * | 3/1951 | Richardson | F16L 19/0286 285/382.5 |
| 2,582,746 | A * | 1/1952 | Champion | F16L 19/028 285/382.5 |
| 2,599,389 | A * | 6/1952 | Hume | F16L 19/028 285/93 |
| 2,685,461 | A * | 8/1954 | Mueller | F16L 19/028 285/382.5 |
| 2,748,463 | A * | 6/1956 | Mueller | F16L 19/028 29/421.1 |
| 4,469,356 | A * | 9/1984 | Duret | F16L 19/028 285/382.5 |
| 4,671,545 | A * | 6/1987 | Miyazaki | F16L 19/028 285/382.5 |
| 4,765,661 | A * | 8/1988 | Fukushima | F16L 19/046 285/382.5 |
| 4,842,310 | A * | 6/1989 | Muffke | B60T 17/04 285/334.5 |
| 5,487,294 | A | 1/1996 | Petersen | |
| 6,089,623 | A | 7/2000 | Schroeder et al. | |
| 2003/0192358 | A1 | 10/2003 | Gouiran | |
| 2009/0189391 | A1 * | 7/2009 | Ferlin | F16L 19/028 285/382.5 |
| 2011/0204623 | A1 | 8/2011 | Weick et al. | |
| 2013/0307265 | A1 * | 11/2013 | Sekino | F16L 19/0283 285/382.5 |

FOREIGN PATENT DOCUMENTS

| | | |
|---|---|---|
| JP | 58-17982 Y2 | 4/1983 |
| JP | 63-144827 A | 6/1988 |
| JP | 11-141759 A | 5/1999 |
| JP | 11-218269 A | 8/1999 |
| JP | 2003-074768 A | 3/2003 |
| JP | 2011-169465 A | 9/2011 |

OTHER PUBLICATIONS

Office Action mailed Jun. 15, 2015 by the Australian Patent Office in the corresponding application No. 2013244568.
International Search Report of the International Searching Authority mailed Jun. 11, 2013 for the corresponding international application No. PCT/JP2013/056340 (and English translation).
Office Action dated Jun. 19, 2015 issued in corresponding CN patent application No. 201310111934.8 (and partial English translation).
Office Action issued Sep. 7, 2015 in the corresponding CN application No. 201310111934.8 (with partial English translation).
Office Action Issued Oct. 20, 2015 in the corresponding JP application No. 2014-509091 (with partial English translation).
Extended European Search Report Issued Dec. 3, 2015 in the corresponding EP application No. 13772404.3.
Office Action issued Jan. 28, 2016 in the corresponding AU application No. 2013244568.
Office Action dated Nov. 4, 2014 issued in corresponding CN patent application No. 201310111934.8 (and English translation).

* cited by examiner

PIPE JOINT, AIR CONDITIONER, METHOD FOR PRODUCING CONNECTING PIPE, CONNECTING PIPE, AND CONNECTION METHOD

CROSS REFERENCE TO RELATED APPLICATION

This application is a U.S. national stage application of International Application No. PCT/JP2013/056340 filed on Mar. 7, 2013, and is based on Japanese Patent Application No. 2012-084258 filed on Apr. 2, 2012, the disclosures of which are incorporated herein by reference.

TECHNICAL FIELD

The present disclosure relates to a pipe joint, an air conditioner, a method for producing a connecting pipe, a connecting pipe, and a connection method.

BACKGROUND ART

When pipes are joined together or when a connection port of a fluid supply source is connected with a pipe, a pipe joint in accordance with an application is utilized. When, for example, a coolant pipe to allow a coolant of an air conditioner to flow is connected with a connection port of an indoor equipment of an air conditioner or an outdoor equipment thereof, in general, a flare pipe joint in compatible with JIS B 8607 is utilized (see, for example, Patent Literature 1).

CITATION LIST

Patent Literature

Patent Literature 1: Unexamined Japanese Patent Application Kokai Publication No. 2003-74768

SUMMARY OF INVENTION

Technical Problem

According to the pipe joint disclosed in Patent Literature 1, when a coolant pipe is connected with the pipe joint, first, a diameter of an end of the coolant pipe to allow a coolant to flow is increased by a flaring tool to form a flared portion (diameter-increasing portion). Next, this flared portion is held between the pipe joint body of the pipe joint and a flare nut to connect the pipe joint with the coolant pipe. According to the pipe joint connected in this way, the flared portion of the coolant pipe contacts the pipe joint body to maintain a sealing performance. Hence, when concavity and convexity like scratches are present in a sealed portion between the flared portion and the pipe joint body, the sealing performance of the pipe joint is deteriorated.

The present disclosure has been made in view of the aforementioned circumstances, and it is an objective to provide a pipe joint, an air conditioner, a method for producing a connecting pipe, a connecting pipe, and a connection method with an assurance of an excellent sealing performance.

Solution to Problem

To accomplish the above objective, a pipe joint according to the present disclosure is a pipe joint, to be connected with a connecting pipe, and includes a pipe joint body and a nut member. The pipe joint body has a male thread formed on the outer circumference, and has a first insertion hole into which the connecting pipe is fitted, and which includes a first joining face joined with the connecting pipe. The nut member has a female thread to be engaged with the male thread, and a second insertion hole into which the connecting pipe is fitted and which includes a second joining face joined with the connecting pipe. When the connecting pipe formed with a bead expanded in the radial direction is connected with this pipe joint, and when the male thread of the pipe joint body is engaged with the female thread of the nut member, the bead is held between the first joining face and the second joining face. In addition, the joined portion between the bead and the first joining face forms a first sealed portion, while the joined portion between the bead and the second joining face forms a second sealed portion. Still further, an end face of the pipe joint body is joined with a part of the inner circumference of the second insertion hole of the nut member to form a third sealed portion.

Advantageous Effects of Invention

According to the present disclosure, when a connecting pipe that has a bead which is expanded in the radial direction and which is formed at an end of the connecting pipe is connected, three sealed portions: a first sealed portion; a second sealed portion; and a third sealed portion are formed. Hence, it becomes possible to provide a pipe joint, an air conditioner, a method for producing a connecting pipe, a connecting pipe, and a connection method with an assurance of an excellent sealing performance.

DESCRIPTION OF EMBODIMENTS

First Embodiment

An explanation will be below given of a pipe joint 10 and an air conditioner 100 according to a first embodiment of the present disclosure with reference to FIGS. 1 to 8. In order to facilitate understanding, an XYZ coordinate system is set and is referred as needed.

Figure 1:
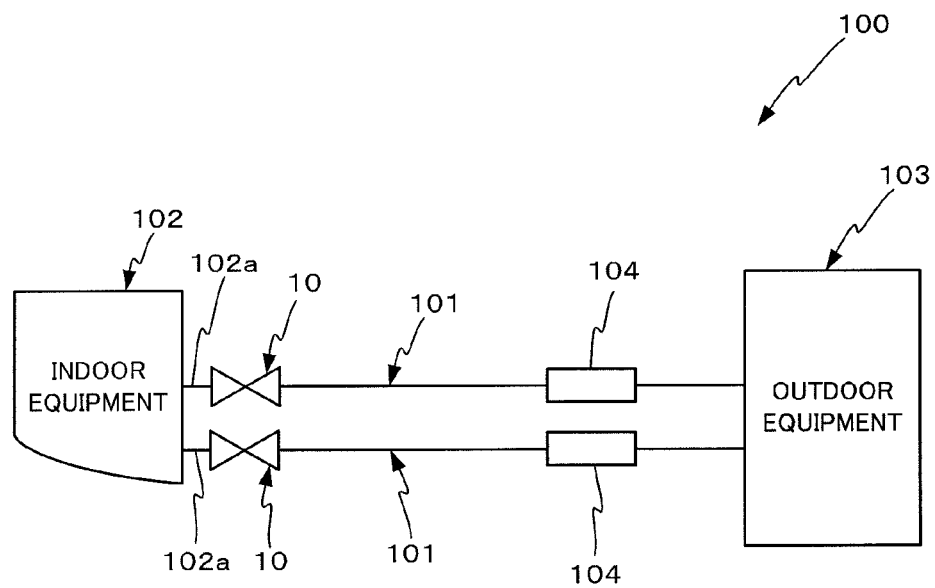
FIG. 1 is an exemplary diagram illustrating an air conditioner according to a first embodiment of the present disclosure.

The air conditioner 100 according to the first embodiment of the present disclosure is utilized to adjust a temperature inside a room subjected to air conditioning. As illustrated in FIG. 1, the air conditioner 100 includes indoor equipment 102, of outdoor equipment 103, and multiple connecting pipes 101 that connect the indoor equipment 102 with the outdoor equipment 103. The connecting pipe 101 is a piping through which a coolant forming a cooling cycle flows. An example coolant applied is R32 containing difluoromethane ($CH_2F_2$). The indoor equipment 102 is installed in the room, and performs heat exchange with air in the room. The outdoor equipment 103 is installed outside the room, and performs heat exchange with air outside the room. In addition, each connecting pipe 101 is provided with a shut-off valve 104. The shut-off valve 104 shuts off the flow of the coolant in the connecting pipe 101, or releases the flow thereof.

Figure 2:
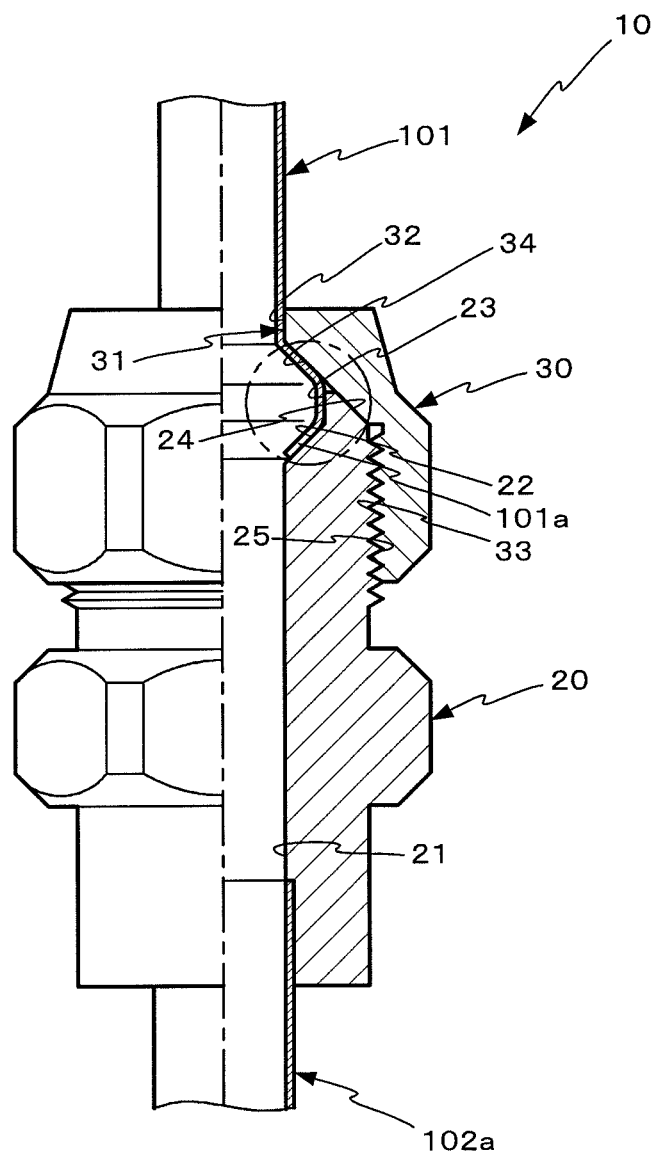
FIG. 2 is a partial cross-sectional view illustrating a pipe joint according to an embodiment of the present disclosure.
Figure 3:
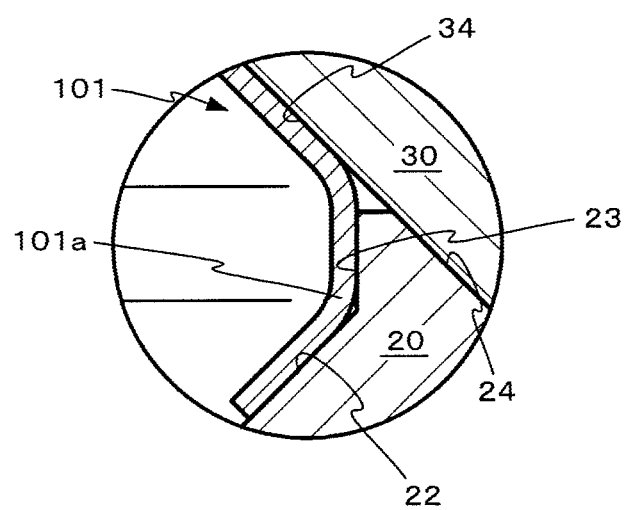
FIG. 3 is a cross-sectional view illustrating a part of FIG. 2 in an enlarged manner.
Figure 3:
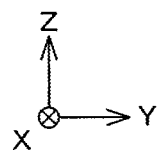

The pipe joint 10 is applied to connect the connecting pipe 101 with a connection port 102a of the indoor equipment 102. As illustrated in FIGS. 2 and 3, the pipe joint 10 includes a pipe joint body 20 and a nut member 30. In those figures, a Z-axis direction corresponds to the axial direction of the pipe joint body 20 and that of the connecting pipe 101.

Figure 4:
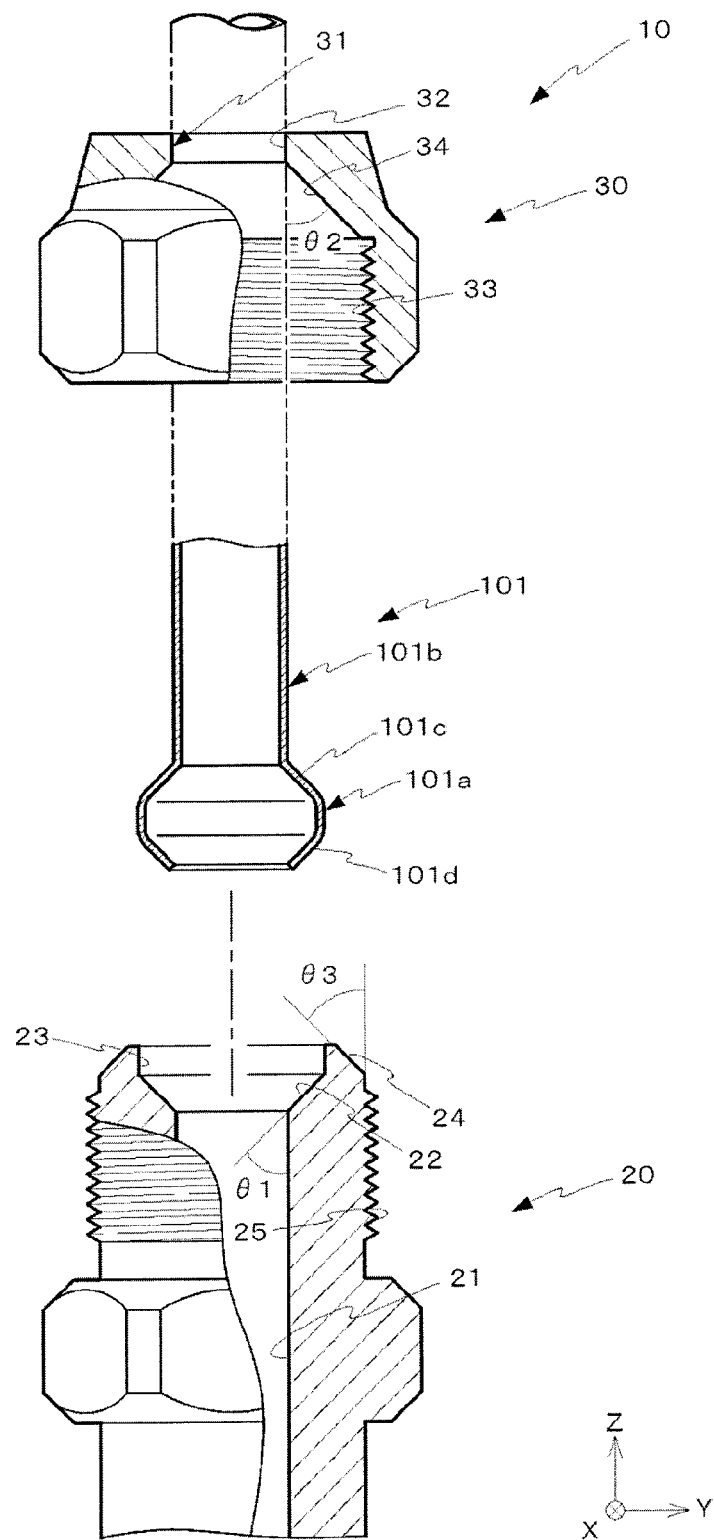
FIG. 4 is a partial cross-sectional view illustrating the pipe joint in an exploded condition.

The pipe joint body 20 is a substantially cylindrical member comprising a male thread 25 formed on an outer circumference. The pipe joint body 20 is formed of, for example, metal, such as stainless steel, steel, or an aluminum alloy, or, a resin. As illustrated in FIG. 4, an insertion hole 21 (first insertion hole) is formed in the pipe joint body 20. The connecting pipe 101 is inserted in the insertion hole 21 from the +Z side, thereby forming a passage through which the coolant of the cooling cycle flows. In addition, a tapered face 22 (first joining face) is formed in the inner circumference of the insertion hole 21. The tapered face 22 is formed so as to be inclined relative to the Z-axis direction (axial direction of connecting pipe 101). An inclination angle θ1 of the tapered face 22 is, for example, 45 degrees. Still further, a straight hole face 23 is formed at the opening of the insertion hole 21 at the +Z side. This straight hole face 23 is formed in parallel with the Z-axis direction (axial direction of connecting pipe 101). As illustrated in FIG. 3, the connection port 102a of the indoor equipment 102 is connected to the end of the pipe joint body 20 at the +Z side. The connection port 102a is connected by, for example, brazing.

As illustrated in FIG. 4, the nut member 30 is a hexagonal nut. The nut member 30 is formed of, for example, metal, such as stainless steel, steel, brass, or an aluminum alloy, or, a resin. An insertion hole 31 (second insertion hole) is formed in the nut member 30 so as to pass all the way therethrough in the Z-axis direction. A portion of the connecting pipe 101 where no bead 101a is formed is inserted in this insertion hole 31. In addition, formed at the inner circumference of the insertion hole 31 are a holding face 32 that holds the connecting pipe 101 in a position in the radial direction, a female thread 33 to be engaged with the male thread 25 of the pipe joint body 20, and a tapered face 34 (second joining face) formed between the holding face 32 and the female thread 33. The tapered face 34 is formed so as to be inclined relative to the Z-axis direction (axial direction of connecting pipe 101). Still further, the tapered face 34 is formed so as to face the tapered face 22 of the pipe joint body 20, and holds the bead 101a of the connecting pipe 101 together with the tapered face 22. An inclination angle θ2 of this tapered face 34 is, for example, 45 degrees. In this embodiment, the nut member 30 is formed in a shape in compliance with JIS B 8607. The present disclosure is not limited to this case, and the nut member 30 may be formed in shapes not in compliance with the JIS.

A tapered face 24 (third joining face) inclined relative to the Z-axis direction is formed at an end face of the pipe joint body 20. The tapered face 24 is formed in parallel with the tapered face 34 of the insertion hole 31 of the nut member 30, and is joined with the tapered face 34 of the nut member 30 when the male thread 25 of the pipe joint body 20 is engaged with the female thread 33 of the nut member 30. In the first embodiment, an inclination angle θ3 of the tapered face 24 is, for example, 45 degrees consistent with the inclination angle θ2 of the tapered face 34.

The connecting pipe 101 illustrated in FIG. 1 is piping that serves as a passage of the coolant flowing through between the indoor equipment 102 of the air conditioner 100 and the outdoor equipment 103 thereof. The connecting pipe 101 is, for example, a metal pipe (copper pipe). As illustrated in FIG. 4, the connecting pipe 101 includes a connecting pipe body 101b, and the bead 101a. The bead 101a is formed at the end of the connecting pipe body 101b at the −Z side so as to expand like a balloon. The bead 101a includes a diameter-increasing portion 101c expanded in the radial direction from the connecting pipe body 101b, and a diameter-reducing portion 101d narrowed in the radial direction from the diameter-increasing portion 101c. In this first embodiment, the bead 101a is formed at the end of the connecting pipe body 101b at the −Z side. The present disclosure is, however, not limited to this case, and the bead may be formed at least a part of the connecting pipe body 101b.

Figure 5:
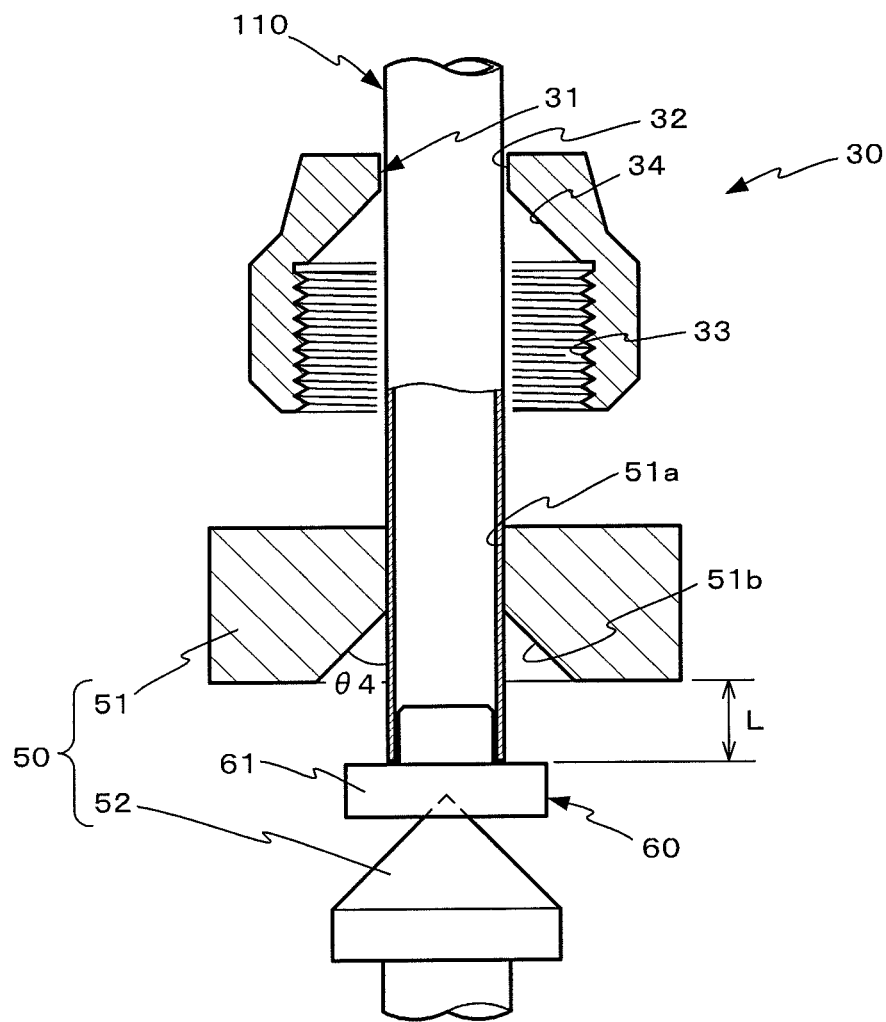
FIG. 5 is a (first) cross-sectional view illustrating a method for producing a connecting pipe.

As illustrated in FIG. 5, the bead 101a of the connecting pipe 101 is formed using a conventional flaring tool (diameter enlarging jig) 50. The flaring tool 50 includes, for example, a flare dice (fastener jig) 51 that fastens the connecting pipe 101, and a flare cone (rotary punching jig) 52 that increases the diameter of the open end of the connecting pipe 101. To form a bead 101a of the connecting pipe 101, first, a base pipe 110 comprising no bead 101a formed is prepared. This base pipe 110 is fitted with the above-explained nut member 30 in advance. Next, the base pipe 110 is fastened to the flare dice 51. More specifically, the base pipe 110 is fitted in a through-hole Ma of the flare dice 51, and is tightened by, for example, a clamper in the radial direction to secure the base pipe 110 to the flare dice 51. This flare dice 51 is disposed at a position by a predetermined distance L (projection dimension) from the end of the base pipe 110 at the −Z direction. In addition, a tapered face 51b is formed in the edge of the opening of the through-hole 51a of the flare dice 51 at the −Z side. An inclination angle θ4 of this tapered face 51b is, for example, 45 degrees consistent with the inclination angle θ2 of the tapered face 34.

Next, an adapter 60 is fitted to the base pipe 110. The adapter 60 is a substantially cylindrical member formed with a flange 61, and is fitted from the −Z side of the base pipe 110. A surface of the flange 61 at the +Z side abuts the end of the base pipe 110 at the −Z side.

Figure 6:
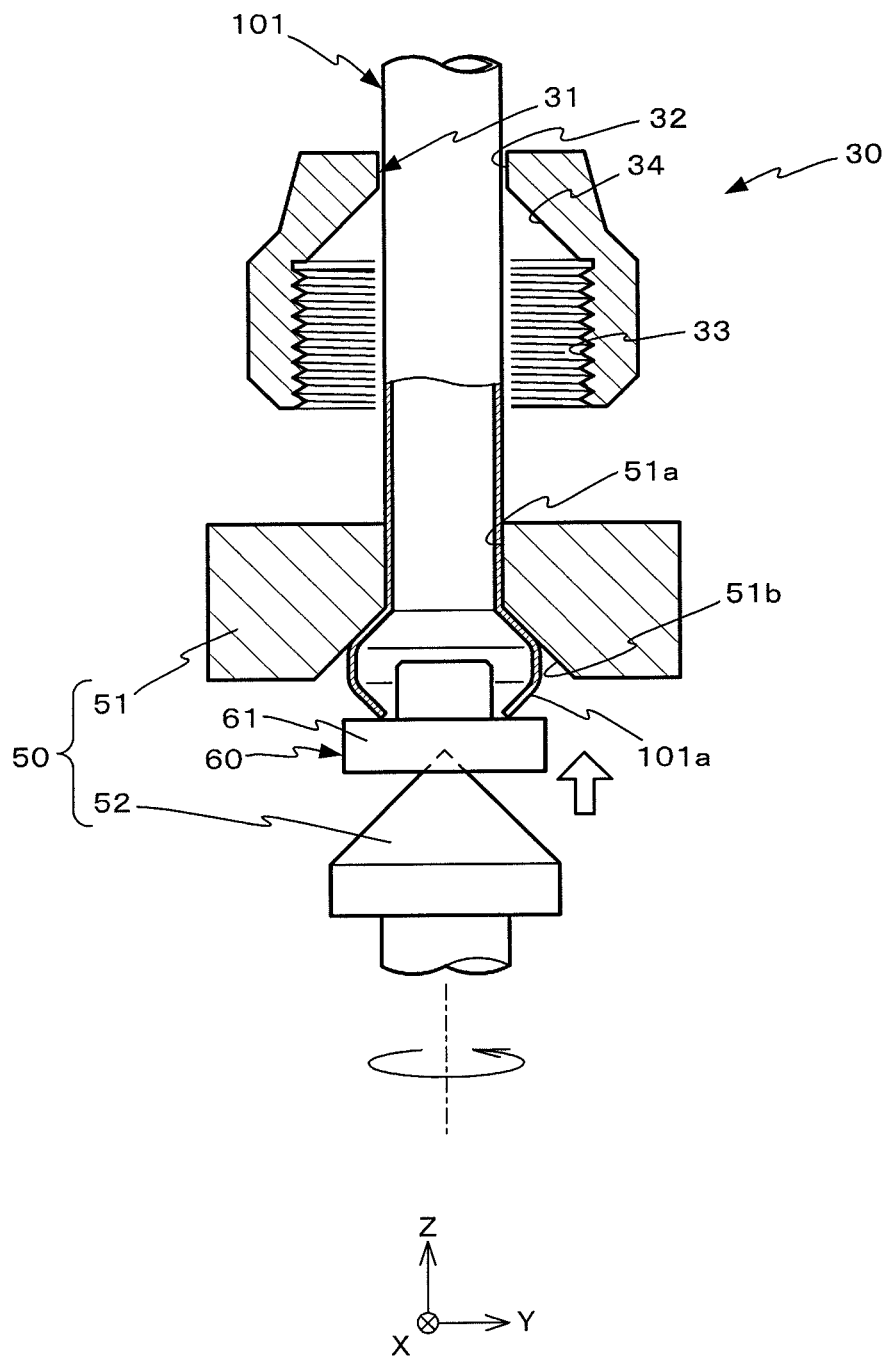
FIG. 6 is a (second) cross-sectional view illustrating the method for producing the connecting pipe.
Figure 7:
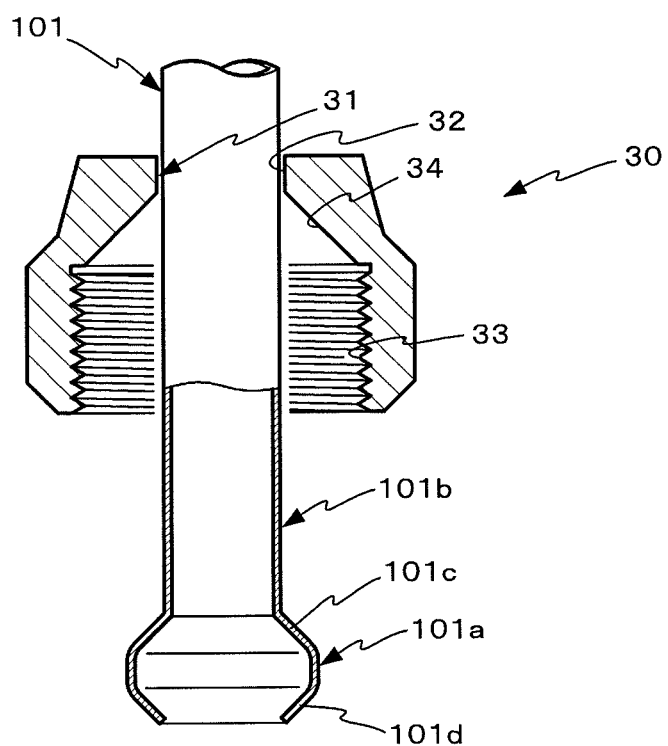
FIG. 7 is a (third) cross-sectional view illustrating the method for producing the connecting pipe.

Subsequently, as illustrated in FIG. 6, the flare cone 52 of the flaring tool 50 is moved in the +Z direction while being rotated around the Z-axis. The flare cone 52 smoothly rotates relative to the adapter 60. When the flare cone 52 is moved in the +Z direction, the adapter 60 compresses the end of the base pipe 110 at the −Z side in the Z-axis direction. The compressed end of the base pipe 110 increases in the diameter, while at the same time, is deformed so as to expand like a balloon while being held by the tapered face 51b of the flare dice 51. As a result, as illustrated in FIG. 7, the connecting pipe 101 formed with the bead 101a is finished.

Figure 8:
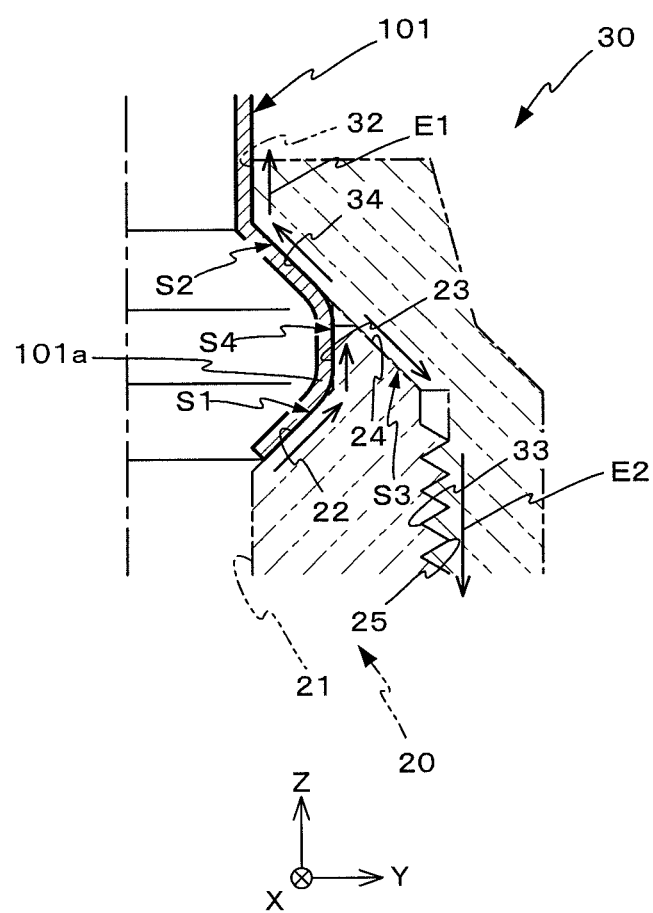
FIG. 8 is a cross-sectional view to explain a connection between a pipe joint and a connecting pipe.

As illustrated in FIG. 8, the bead 101a formed as explained above is held between the tapered face 22 of the insertion hole 21 of the pipe joint body 20 and the tapered face 34 of the insertion hole 31 of the nut member 30 in the Z-axis direction (axial direction of connecting pipe 101) and is fastened therebetween when the pipe joint body 20 is engaged with the nut member 30. When the bead 101a is compressed in the Z-axis direction and abuts the tapered face 22, a sealed portion S1 (first sealed portion) is formed. Likewise, when the bead 101a is compressed in the Z-axis direction and abuts the tapered face 34, a sealed portion S2 (second sealed portion) is formed. Still further, when the bead 101a is held between the opposing tapered faces 22, 34, the bead slightly increases in the diameter, and abuts the straight hole face 23. When the bead 101a abuts the straight hole face 23, a sealed portion S4 (fourth sealed portion) is formed.

Moreover, when the pipe joint body 20 is engaged with the nut member 30, the tapered face 34 of the insertion hole 31 of the nut member 30 is joined with the tapered face 24 of the end face of the pipe joint body 20. Hence, a sealed portion S3 (third sealed portion, metal seal) is formed. Therefore, the pipe joint 10 connected with the connecting pipe 101 is sealed at the four sealed portions (sealed portions S1, S2, S3, and S4).

As explained above, according to this first embodiment, the bead 101a of the connecting pipe 101 is held between the tapered face 22 of the pipe joint body 20 and the tapered face 34 of the nut member 30, while at the same time, abuts the straight hole face 23. Accordingly, the sealed portions S1, S2, and S4 are formed. In addition, the tapered face 34 of the nut member 30 is joined with the tapered face 24 of the pipe joint body 20, thereby forming the sealed portion S3. Hence, it becomes possible to provide a pipe joint, an air conditioner, and a method for producing a connecting pipe to be joined with the pipe joint with an assurance of an excellent sealing performance.

In this first embodiment, when a leakage route of the coolant is considered, as is clear from FIG. 8, two leakage routes E1, E2 are possible. More specifically, the leakage route E1 is a route in which the coolant travels along the outer circumference of the bead 101a of the connecting pipe 101, and leaks out from the holding face 32 of the nut member 30. The leakage route E2 is a route in which the coolant travels along the outer circumference of the bead 101a of the connecting pipe 101, and leaks out from the threaded portion between the male thread 25 and the female thread 33. When the coolant leaks through the leakage route E1, the coolant passes through the three locations: the sealed portion S1; the sealed portion S4; and the sealed portion S2. Conversely, when the coolant leaks through the leakage route E2, the coolant passes through the three locations: the sealed portion S1; the sealed portion S4; and the sealed portion S3. Hence, even if there is a leakage of the coolant due to concavity and convexity like scratches at any one of those sealed portions S1 to S4, the remaining sealed portions S1 to S4 keep maintaining the sealed condition, and thus the coolant is prevented from leaking to the exterior of the pipe joint 10.

In contrast, according to conventional pipe joints that hold the flared portion of the pipe between the pipe joint body and the nut member, this structure employs only one sealed portion. Accordingly, when there is concavity and convexity like scratches in the sealed portion between the flared portion and the pipe joint body, the sealing performance of the pipe joint is deteriorated, resulting in a leakage of the coolant.

According to the pipe joint 10 of this first embodiment, however, the four sealed portions S1 to S4 ensure the sealed condition, and thus even if there are concavity and convexity like scratches in any one of the sealed portion, the pipe joint 10 can appropriately prevent the coolant from leaking to the exterior of the pipe joint.

Still further the pipe joint 10 of this first embodiment includes the pipe joint body 20 and the nut member 30. Hence, it is unnecessary to additionally use components like a front ferule and a back ferule to be disposed between the pipe joint body 20 and the nut member 30 in order to enhance the sealing performance. Therefore, an increase of the production costs due to the increase of the number of components can be avoided.

The connecting pipe 101 connected with the pipe joint 10 of this first embodiment is formed using a conventional flaring tool (diameter enlarging jig) 50 with the adapter 60 being fitted with the base pipe 110. Hence, regardless of the proficiency of the flaring work by a user, the connecting pipe 101 easily formed with the bead 101a is easily obtainable. In addition, the variability of the work precision on the formed connecting pipe 101 can be reduced.

Figure 9A:
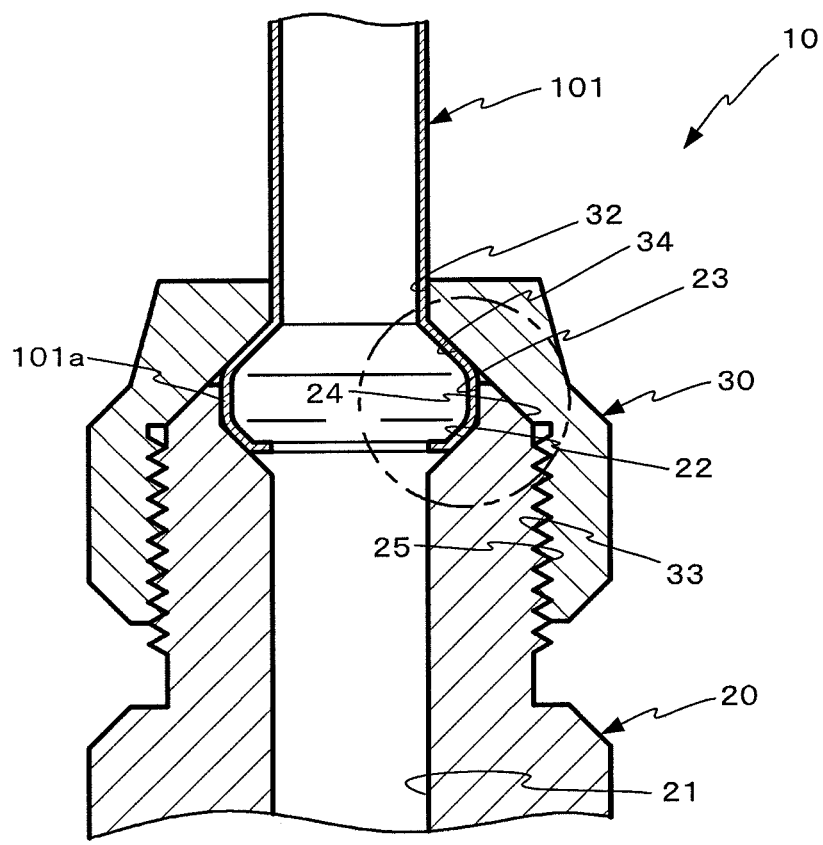
FIG. 9A is a cross-sectional view illustrating a pipe joint connected with a connecting pipe formed with a bead in a different shape.
Figure 9B:
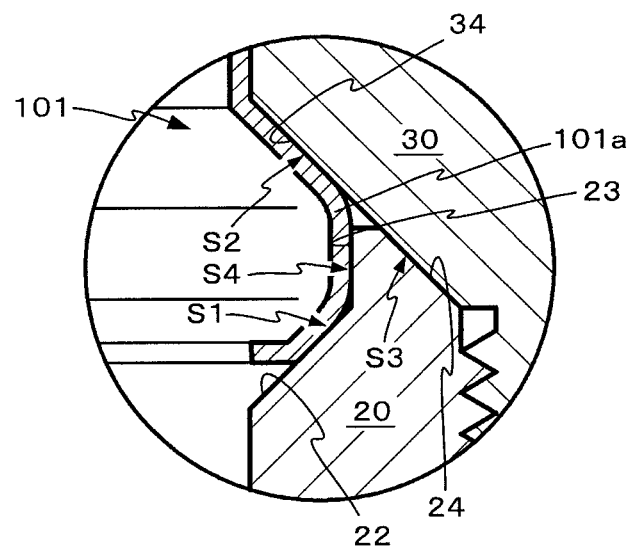
FIG. 9B is a cross-sectional view of FIG. 9A partially enlarged.
Figure 9B:
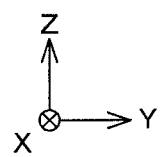

As illustrated in FIGS. 9A and 9B, when the end of the bead 101a at the −Z side is formed inwardly, even if the shape of the bead slightly varies, the connecting pipe can be easily joined with the pipe joint 10 of this first embodiment.

The explanation was given of the first embodiment of the present disclosure, but the present disclosure is not limited to the aforementioned first embodiment.

For example, according to the first embodiment, the explanation was given of an example case in which the tapered face 22 of the insertion hole 21 of the pipe joint body 20 has the inclination angle θ1 of 45 degrees. However, the present disclosure is not limited to this case, and the inclination angle θ1 may be other degrees than 45 degrees. However, from the standpoint of the easiness of a formation of the bead 101a of the connecting pipe 101, it is preferable that the inclination angle θ1 should be between 43 and 47 degrees, and further preferably, 45 degrees as indicated in this embodiment.

In addition, according to the first embodiment, the explanation was given of an example case in which the tapered face 34 of the insertion hole 31 of the nut member 30 has the inclination angle θ2 of 45 degrees. However, the present disclosure is not limited to this case, and the inclination angle θ2 may be other degrees than 45 degrees. However, from the standpoint of the easiness of a formation of the bead 101a of the connecting pipe 101, it is preferable that the inclination angle θ2 should be between 43 and 47 degrees, and further preferably, 45 degrees as indicated in this embodiment.

According to the first embodiment, the explanation was given of an example case in which the tapered face 24 formed at the end face of the pipe joint body 20 has the inclination angle θ3 of 45 degrees. The present disclosure is, however, not limited to this case, and the inclination angle θ3 may be other angles than 45 degrees. However, it is preferable that this inclination angle should be substantially equal to the inclination angle θ2 of the tapered face 34 of the insertion hole 31 of the nut member 30.

Second Embodiment

Figure 10:
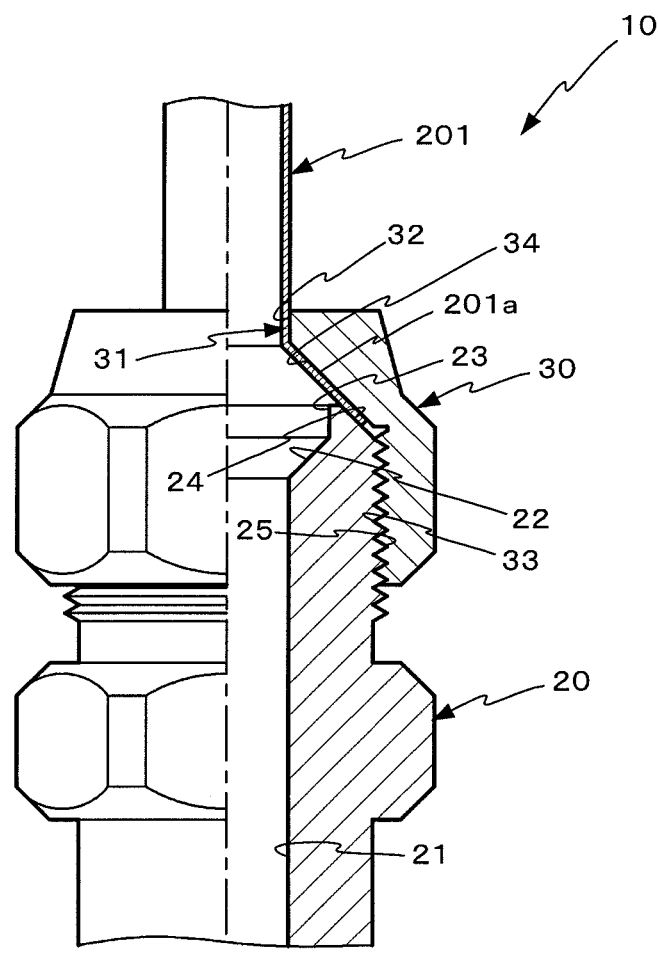
FIG. 10 is a cross-sectional view illustrating a pipe joint according to a second embodiment of the present disclosure.
Figure 10:
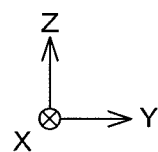

As illustrated in FIG. 10, instead of the connecting pipe 101 formed with the bead 101a, a connecting pipe 201 formed with a flared portion 201a (diameter-increasing portion) can be connected to the pipe joint 10 of this embodiment. In this case, when the flared portion 201a is held between the tapered face 24 formed at the insertion hole 21 of the nut member 30 and the tapered face 34 formed at the outer circumference of the pipe joint body 20, the connecting pipe 201 is connected with the pipe joint 10. Hence, a conventional pipe joint connected with the connecting pipe 201 having already formed with the flared portion 201a is interchangeable with the pipe joint 10 of this embodiment. In addition, when replacing the pipe joint connected with the connecting pipe, a user can select either one of the pipe joint 10 of this embodiment or the conventional pipe joint as needed.

Third Embodiment

Figure 11A:
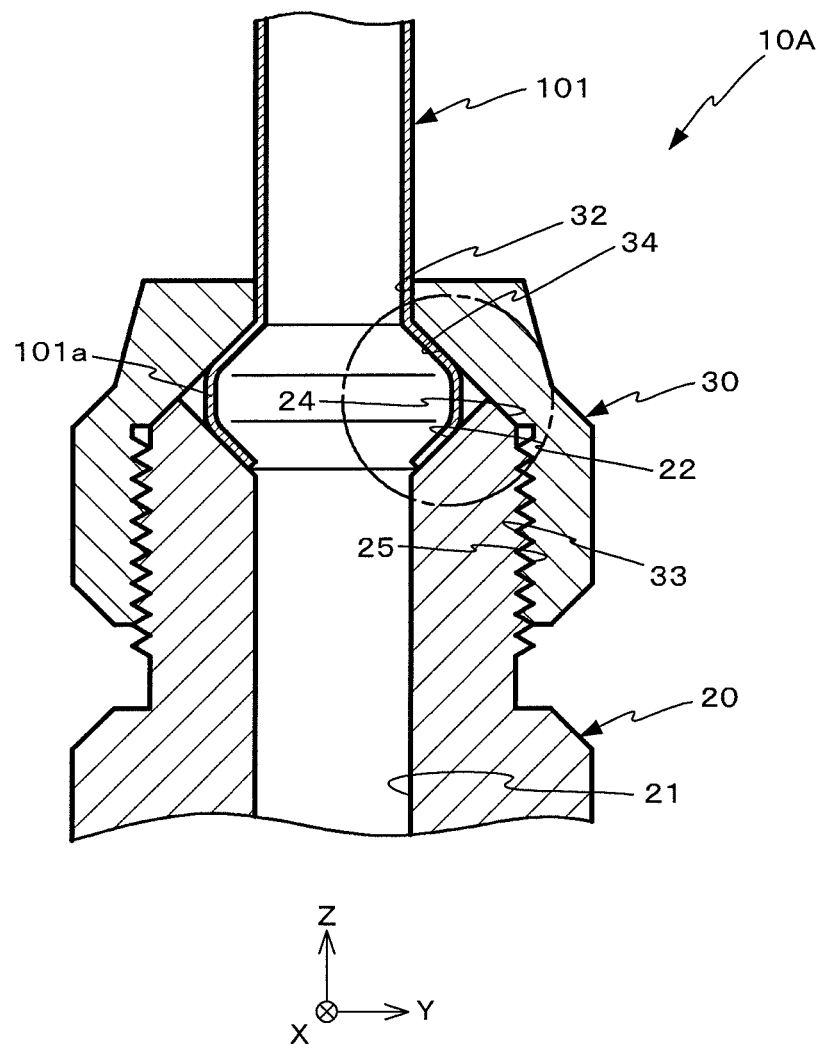
FIG. 11A is a cross-sectional view illustrating pipe joint according to a third embodiment of the present disclosure.
Figure 11B:
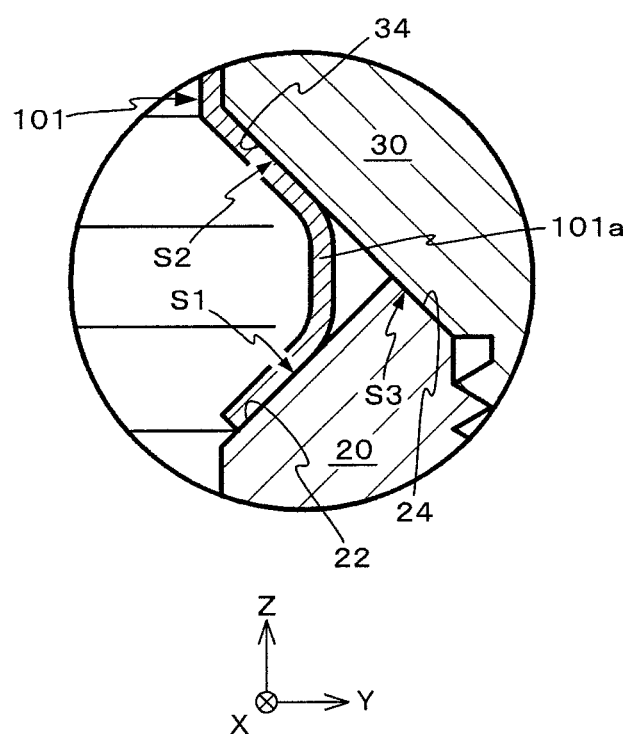
FIG. 11B is a cross-sectional view of FIG. 11A partially enlarged.

According to the aforementioned first embodiment, the pipe joint body 20 has the straight hole face 23 that forms the sealed portion S4. The present disclosure is, however, not limited to this case, and like a pipe joint 10A illustrated in FIG. 11A and FIG. 11B according to a third embodiment, the straight hole face 23 can be omitted. In this case, also, the three sealed portions S1, S2, and S3 ensure the sealed condition, thereby suitably preventing the coolant from leaking to the exterior of the pipe joint 10A. However, according to the pipe joint 10 of the first embodiment (a case in which the straight hole face 23 is employed), the four sealed portions S1, S2, S3, and S4 ensure the sealed condition. Hence, from the standpoint of the better sealing performance, it is preferable to employ the straight hole face 23.

Fourth Embodiment

Figure 12A:
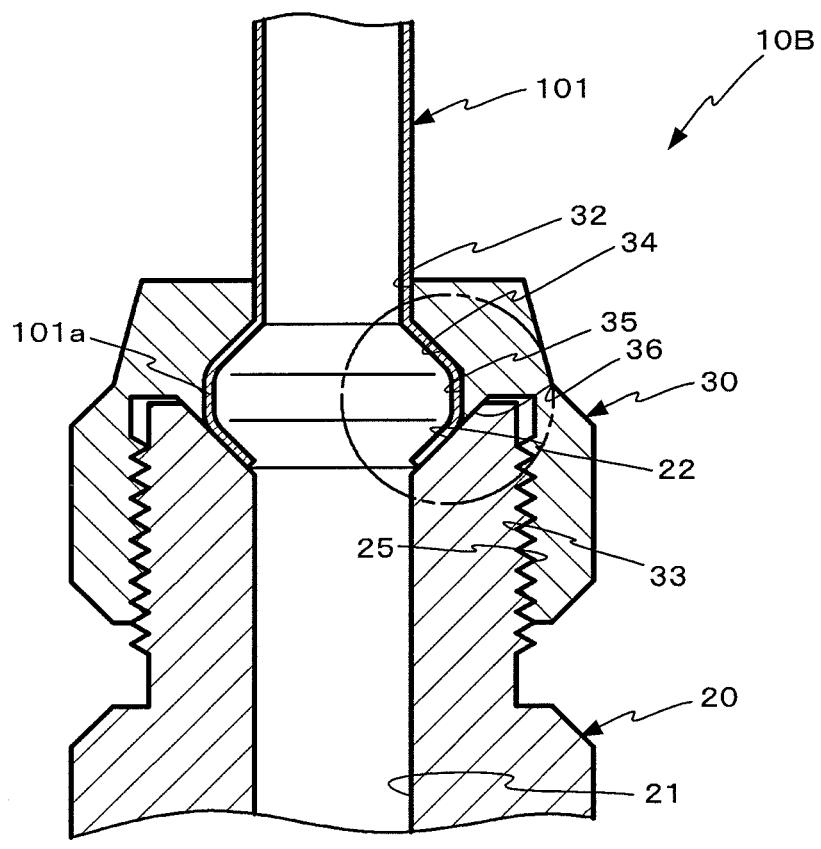
FIG. 12A is a cross-sectional view illustrating a pipe joint according to a fourth embodiment of the present disclosure.
Figure 12B:
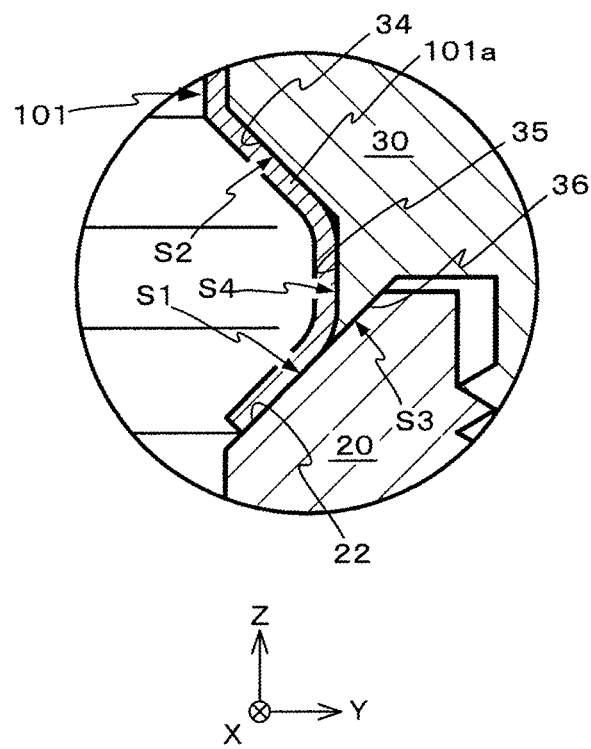
FIG. 12B is a cross-sectional view of FIG. 12A partially enlarged.

According to the first embodiment, the pipe joint body 20 has the straight hole face 23 that forms the sealed portion S4. However, the present disclosure is not limited to this case, and like a pipe joint 10B illustrated in FIG. 12A and FIG. 12B according to a fourth embodiment, the nut member 30 may have a straight hole face 35. In this case, when the bead 101a of the connecting pipe 101 is held between the tapered face 22 of the pipe joint body 20 and the tapered face 34 of the nut member 30, and abuts the inner circumference of the straight hole face 35 of the nut member 30, the sealed portions S1, S2, and S4 are formed. In addition, when a tapered face 36 of the nut member 30 is joined with the tapered face 22 of the pipe joint body 20, the sealed portion S3 (metal seal) is formed.

According to the first to fourth embodiments, the explanation was given of an example case in which the coolant of the cooling cycle is R32 containing difluoromethane ($CH_2F_2$). The present disclosure is, however, not limited to this case, and the coolant may be HFO1234yf (hydro-floro-olefin) or may be a mixed coolant of R32 and HPO1234yf.

R32 and HFO1234yf are utilized as an alternative for conventional coolants (for example, R22, and R410A) for the purpose of global warming suppression, but are burnable unlike the conventional coolants. According to the pipe joint 10 of the embodiments, as explained above, an excellent sealing performance is ensured. Hence, when a burnable alternative is utilized, the air conditioner 100 can be safely operated.

According to the first to fourth embodiments, the pipe joint 10 is utilized for a connection between the connecting pipe 101 and the connection port 102a of the indoor equipment 102 of the air conditioner 100, but the present disclosure is not limited to this case. The pipe joint can be utilized for a connection between the connecting pipe 101 and the connection port of the outdoor equipment 103.

According to the first to fourth embodiments, the pipe joint 10 is used for the connecting pipe 101 that feeds the coolant of the air conditioner 100, but the present disclosure is not limited to this case. The pipe joint is applicable to other pipes than the connecting pipe 101 of the air conditioner 100 as long as such pipes are to feed liquid or gas.

The present disclosure permits various embodiments and modifications thereof without departing from the broadest scope and spirit of the present disclosure.

The aforementioned embodiments are to explain the present disclosure, and are not to limit the scope and spirit of the present disclosure.

This application is based on Japanese Patent Application No. 2012-84258 filed on Apr. 2, 2012, containing the specification, the claims, the drawings, and the abstract. The entire disclosure of this Japanese Patent Application is herein incorporated in this specification by reference.

INDUSTRIAL APPLICABILITY

The pipe joint of the present disclosure is suitable for interconnecting connecting pipes of an air conditioner together. The air conditioner of the present disclosure is suitable for air-conditioning of an air-conditioning target. The method for producing a connecting pipe according to the present disclosure is suitable to produce the connecting pipe utilized for the air conditioner. The connection method of the present disclosure is suitable to connect the pipe joint of the air conditioner with the connecting pipe.

REFERENCE SIGNS LIST 10, 10A, 10B Pipe joint
20 Pipe joint body
21 Insertion hole (first insertion hole)
22 Tapered face (first joining face)
23 Straight hole face
24 Tapered face (third joining face)
25 Male thread
30 Nut member
31 Insertion hole (second insertion hole)
32 Holding face
33 Female thread
34 Tapered face (second joining face)
35 Straight hole face
36 Tapered face
50 Flaring tool
51 Flare dice
51a Through-hole
51b Tapered face
52 Flare cone
60 Adapter 61 Flange
100 Air conditioner
101 Connecting pipe
101a Bead
101b Connecting pipe body
101c Diameter-increasing portion
101d Diameter-reducing portion
102 Indoor equipment
102a Connection port
103 Outdoor equipment
104 Shut-off valve
110 Pipe member
201 Connecting pipe
201a Flared portion
θ1, θ2, θ3, θ4 Inclination angle
E1, E2 Leakage route
S1, S2, S3, S4 Sealed portion

The invention claimed is:

1. A pipe joint connected with a connecting pipe through which a fluid flows, the pipe joint comprising:
a pipe joint body having an outer cylindrical surface with a male thread and a first insertion hole extending in an axial direction of the pipe joint body into which the connecting pipe is fitted, the first insertion hole including a first joining face joined with the connecting pipe having a shape matching an inverted truncated cone; and
a nut member having an inner cylindrical surface with a female thread and a second insertion hole extending in the axial direction of the pipe joint into which the connecting pipe is fitted, the second insertion hole including a second joining face having a shape matching a truncated cone; and
the connecting pipe having a bead expanded in a radial direction, the bead having first and second surfaces with shapes respectively matching the inverted truncated cone and truncated cone of the first joining face of the pipe joint body and the second joining face of the nut member,
wherein the bead is held between the first joining face and the second joining face by threading the female thread of the nut member onto the male thread of the pipe joint body and tightening the nut member onto the pipe joint body,
a joined portion between the first joining face and the first matching surface of the bead forms a first sealed portion that suppresses a leakage of the fluid, and a joined portion between the second joining face and the second matching surface of the bead forms a second sealed portion that suppresses a leakage of the fluid, and
the pipe joint body has an end face extending parallel with the second joining face of the nut member in a cross-sectional view and a shape matching the truncated cone of the nut member, and the end face of the pipe joint body is joined with an outer part of the second joining face of the nut member to form a third sealed portion that suppresses a leakage of the fluid.

2. The pipe joint according to claim 1, wherein:
the first joining face comprises an inclined face inclined relative to an axial direction of the pipe joint body; and
an inclination angle of the first joining face is between 43 to 47 degrees.

3. The pipe joint according to claim 1, wherein:
the second joining face comprises an inclined face inclined relative to an axial direction of the nut member; and
an inclination angle of the second joining face is between 43 to 47 degrees.

4. An air conditioner comprising:
a connecting pipe through which a coolant of a cooling cycle flows; and
the pipe joint according to claim 1 and connected to the connecting pipe.

5. The air conditioner according to claim 4, wherein the coolant comprises R32 containing difluoromethane ($CH_2F_2$).

6. A pipe joint connected with a connecting pipe through which a fluid flows, the pipe joint comprising:
a pipe joint body having an outer cylindrical surface with a male thread and a first insertion hole extending in an axial direction of the pipe joint body into which the connecting pipe is fitted, the first insertion hole including a first joining face joined with the connecting pipe having a shape matching an inverted truncated cone; and
a nut member having an inner cylindrical surface with a female thread and a second insertion hole extending in the axial direction of the pipe joint into which the connecting pipe is fitted, the second insertion hole including a second joining face having a shape matching a truncated cone; and
the connecting pipe having a bead expanded in a radial direction, the bead having first and second surfaces with shapes respectively matching the inverted truncated cone and truncated cone of the first joining face of the pipe joint body and the second joining face of the nut member,
wherein the bead is held between the first joining face and the second joining face by threading the female thread of the nut member onto the male thread of the pipe joint body and tightening the nut member onto the pipe joint body,
a joined portion between the first joining face and the first matching surface of the bead forms a first sealed portion that suppresses a leakage of the fluid, and a joined portion between the second joining face and the second matching surface of the bead forms a second sealed portion that suppresses a leakage of the fluid, and
end face of the pipe joint body is joined with part of an inner circumference of the second insertion hole of the nut member to form a third sealed portion that suppresses a leakage of the fluid, wherein:
either one of the first insertion hole of the pipe joint body or the second insertion hole of the nut member comprises a straight hole face parallel to an axis of the pipe joint body; and
when the connecting pipe comprising the bead expanded in the radial direction and formed at an end of the connecting pipe is connected, the bead is held between the first joining face and the second joining face, and is expanded in the radial direction so as to be joined with the straight hole face to form a fourth sealed portion that suppresses a leakage of the fluid.

7. The pipe joint according to claim 6, wherein the straight hole face is formed near an opening of the first insertion hole of the pipe joint body.

8. A connecting pipe through which a fluid flows, the connecting pipe comprising:
a connecting pipe body;
a bead formed at an end of the connecting pipe body, the bead extending in the axial direction of the connecting pipe body and including a diameter-increasing portion extending in a radial direction of the connecting pipe body, a fixed diameter portion and a diameter-reducing portion narrowed in the radial direction from the fixed diameter portion; and an outer cylindrical surface of the bead including a first surface having an inverted truncated cone shape configured to match a corresponding first joining face of a pipe joint body and a second face having a truncated cone shape configured to match a corresponding second joining face of a nut member to be threaded onto the pipe joint body;

wherein when the connecting pipe is connected with a pipe joint that includes the pipe joint body and the nut member, the pipe joint being formed with a male thread on an outer circumference and being formed with a first insertion hole into which the connecting pipe is fitted, and the nut member being formed with a female thread engaged with the male thread and being formed with a second insertion hole into which the connecting pipe is fitted, the bead is held between the first joining face of the pipe joint body and the second joining face of the nut member when the male thread of the pipe joint body is engaged with the female thread of the nut member, a joined portion between the bead and the first joining face forms a first sealed portion that suppresses a leakage of the fluid, and a joined portion between the bead and the second joining face forms a second sealed portion that suppresses a leakage of the fluid, and an end face of the pipe joint body is joined with a part of an inner circumference of the second insertion hole of the nut member to form a third sealed portion that suppresses a leakage of the fluid; and wherein when the connecting pipe is connected with the pipe joint that further comprises a straight hole face which is formed in either one of the first insertion hole of the pipe joint body or the second insertion hole of the nut member and which is parallel to an axis of the pipe joint body, the bead extends in the radial direction and is joined with the straight hole face to form a fourth sealed portion that suppresses a leakage of the fluid.

9. A connection method for a pipe joint with a connecting pipe, the pipe joint comprising:

a pipe joint body having an outer cylindrical surface with a male thread and a first insertion hole extending in an axial direction of the pipe joint body into which the connecting pipe through which a fluid flows is fitted, the first insertion hole including a first joining face joined with the connecting pipe having a shape matching an inverted truncated cone; and a nut member having an inner cylindrical surface with a female thread and a second insertion hole extending in the axial direction of the pipe joint into which the connecting pipe is fitted, the second insertion hole including a second joining face having a shape matching a truncated cone, the connecting pipe comprising a bead expanded in a radial direction, the bead having first and second surfaces with shapes respectively matching the shapes of the first joining face of the pipe joint body and the second joining face of the nut member, wherein the pipe joint body has an end face extending parallel with the second joining face of the nut member in a cross-sectional view and a shape matching the truncated cone of the nut member, the method comprising:

arranging the bead between the first joining face of the pipe joint member and the second joining face of the nut member;

threading the female thread of the nut member onto the male thread of the pipe joint body and tightening the nut member onto the pipe joint body to hold the bead between the first joining face and the second joining face and forming a first sealed portion between the bead and the first joining face that suppresses a leakage of the fluid and a second sealed portion between the bead and the second joining face that suppresses a leakage of the fluid;

joining the end face of the pipe joint body with an outer part the second joining face of the nut member and forming a third sealed portion that suppresses a leakage of the fluid.

* * * * *